(12) United States Patent
Warren, Jr.

(10) Patent No.: US 7,549,021 B2
(45) Date of Patent: Jun. 16, 2009

(54) ENHANCED DATA INTEGRITY USING PARALLEL VOLATILE AND NON-VOLATILE TRANSFER BUFFERS

(75) Inventor: Robert W. Warren, Jr., Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 67 days.

(21) Appl. No.: 11/359,348

(22) Filed: Feb. 22, 2006

(65) Prior Publication Data

US 2007/0198796 A1    Aug. 23, 2007

(51) Int. Cl.
G06F 12/00    (2006.01)
G06F 13/00    (2006.01)
G06F 13/28    (2006.01)

(52) U.S. Cl. .................. 711/119; 711/112; 711/113; 711/118

(58) Field of Classification Search ............... 711/112
See application file for complete search history.

(56) References Cited

U.S. PATENT DOCUMENTS

| | | | |
|---|---|---|---|
| 5,233,618 A | 8/1993 | Glider et al. | |
| 5,371,855 A | 12/1994 | Idleman et al. | |
| 5,475,697 A | 12/1995 | Katz et al. | |
| 5,519,831 A * | 5/1996 | Holzhammer ............... | 714/22 |
| 5,555,391 A | 9/1996 | De Subijana et al. | |
| 5,586,291 A * | 12/1996 | Lasker et al. ............... | 711/113 |
| 5,734,861 A | 3/1998 | Cohn et al. | |
| 6,058,455 A | 5/2000 | Islam et al. | |
| 6,076,143 A | 6/2000 | Blumenau | |
| 6,134,626 A | 10/2000 | Inokuchi et al. | |
| 6,219,752 B1 | 4/2001 | Sekido | |
| 6,282,041 B1 | 8/2001 | Blumenau | |
| 6,330,640 B1 | 12/2001 | Williams et al. | |
| 6,418,510 B1 | 7/2002 | Lamberts | |
| 6,505,273 B2 | 1/2003 | Taroda et al. | |
| 6,513,094 B1 | 1/2003 | Magro | |
| 6,539,518 B1 * | 3/2003 | Fang et al. ............... | 714/805 |
| 6,567,888 B2 | 5/2003 | Kedem | |
| 6,772,310 B2 | 8/2004 | Thompson et al. | |
| 6,785,767 B2 * | 8/2004 | Coulson ............... | 711/112 |
| 6,795,894 B1 | 9/2004 | Neufeld et al. | |
| 6,839,802 B2 | 1/2005 | Dimitri et al. | |
| 6,839,803 B1 | 1/2005 | Loh et al. | |
| 6,865,642 B2 | 3/2005 | Day, III et al. | |
| 6,898,669 B2 | 5/2005 | Tomita | |
| 2004/0003172 A1 | 1/2004 | Su et al. | |
| 2005/0177680 A1 * | 8/2005 | Miura ............... | 711/112 |

* cited by examiner

*Primary Examiner*—Kevin L Ellis
*Assistant Examiner*—Ryan Bertram
(74) *Attorney, Agent, or Firm*—Fellers, Snider, et al.

(57) ABSTRACT

Method and apparatus for transferring data. The apparatus preferably includes a first volatile memory block, a second volatile memory block coupled to a non-volatile circular buffer, and a controller configured to direct first data to the first volatile memory block for subsequent transfer to a downstream block, such as a data storage array. The controller is further configured to direct second data to the second volatile memory block for subsequent transfer to the non-volatile circular buffer. Preferably, the second volatile memory block forms a portion of a non-volatile random access memory (NVRAM) and the circular buffer is formed from a flash memory device. An intelligence block preferably controls said subsequent transfer of the second data from the second volatile memory block to the circular buffer. The second data are preferably transferred from the circular buffer to the downstream block in conjunction with the transfer of the first data.

27 Claims, 5 Drawing Sheets

ENHANCED DATA INTEGRITY USING PARALLEL VOLATILE AND NON-VOLATILE TRANSFER BUFFERS

FIELD OF THE INVENTION

The claimed invention relates generally to the field of data transfer systems and more particularly, but not by way of limitation, to an apparatus and method for transferring data between a host device and a downstream block such as a storage array.

BACKGROUND

Data transfer systems are configured to transmit user data in a fast and efficient manner. In a data storage device, the data are generally transferred to one or more non-volatile storage media, such as rotatable magnetic recording discs accessed by a corresponding array of data transducers. In a communication system, the data are generally transferred across a link, network or other communication path to a receiving unit.

An interface circuit can be configured to temporarily buffer transfer data in volatile memory, such as DRAM, pending transfer to the associated downstream block. For example, in a data storage device the data can be buffered to schedule an access operation with the transducers and media to subsequently transfer the buffered data to the media.

While operable, as requirements for data integrity continue to increase, there remains a continual need for improvements in the manner in which data are transferred to a downstream block, and it is to these and other improvements that preferred embodiments of the present invention are generally directed.

SUMMARY OF THE INVENTION

Preferred embodiments of the present invention are generally directed to an apparatus and method for transferring data.

The apparatus preferably includes a first volatile memory block, a second volatile memory block coupled to a non-volatile circular buffer, and a controller configured to direct first data to the first volatile memory block for subsequent transfer to a downstream block, such as a data storage array. The controller is further configured to direct second data to the second volatile memory block for subsequent transfer to the non-volatile circular buffer.

Preferably, the second volatile memory block forms a portion of a non-volatile random access memory (NVRAM) and the circular buffer is formed from a flash memory device.

An intelligence block preferably controls said subsequent transfer of the second data from the second volatile memory block to the circular buffer. Preferably, the data stored in the circular buffer are subsequently transferred to the downstream block in conjunction with the transfer of data from the first volatile memory block to the downstream block.

In this way, parallel volatile and non-volatile transfer buffers are provided which can be selected by the controller as desired, with no appreciable delay associated with the input of the data to the non-volatile transfer buffer from a host standpoint.

These and various other features and advantages which characterize the claimed invention will become apparent upon reading the following detailed description and upon reviewing the associated drawings.

DETAILED DESCRIPTION

Figure 1:
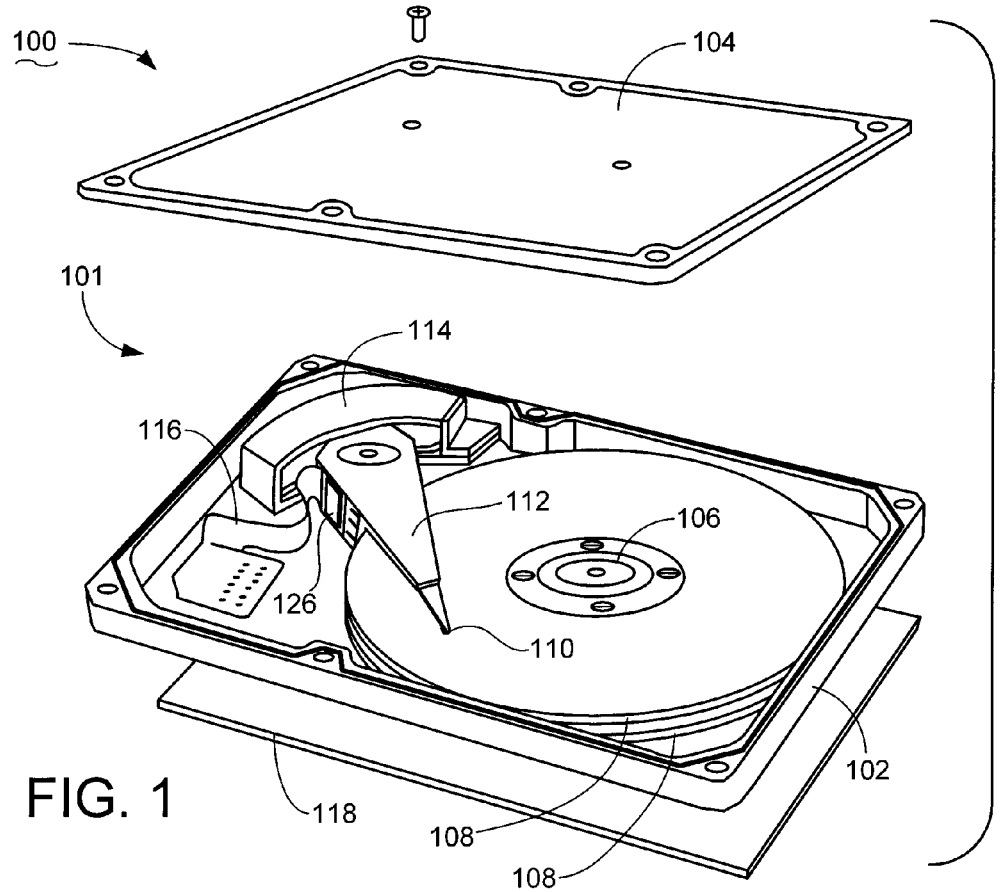
FIG. 1 is an exploded, perspective view of a data storage device constructed in accordance with preferred embodiments of the present invention.

While the claimed invention has utility in any number of different data transfer applications, FIG. 1 has been provided to illustrate a particularly suitable environment in which the claimed invention can be advantageously practiced.

FIG. 1 shows an exploded, perspective top plan representation of a data storage device 100 of the type used to magnetically store and retrieve computerized user data. The device 100 includes a sealable housing 101 formed from a base deck 102 and a top cover 104.

The housing 101 provides a controlled interior environment for various constituent components of the device 100, including a spindle motor 106 used to rotate a number of data storage media 108. Two such media 108 are shown and preferably comprise axially aligned magnetic recording discs.

Data are stored to and retrieved from the media 108 by an array of data transducing heads 110. The heads 110 (also referred to as "data transducers") are supported by a rotary actuator 112 and moved across the media surfaces by a voice coil motor (VCM) 114.)

A flex circuit 116 establishes electrical communication paths between the actuator 112 and control circuitry on a printed circuit board (PCB) 118 mounted to the underside of the base deck 102.

Figure 2:
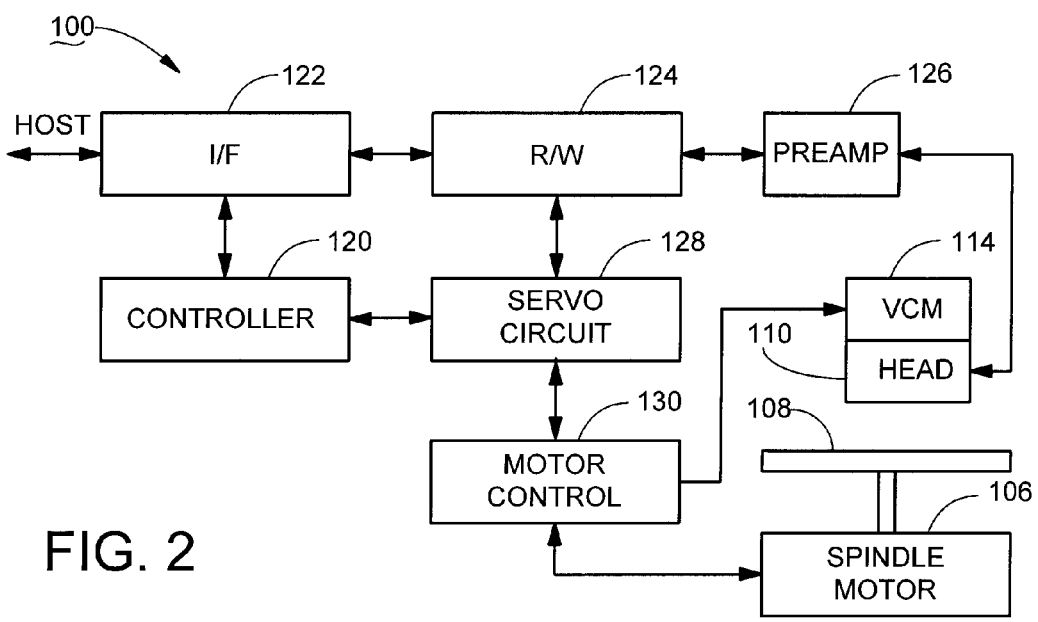
FIG. 2 is a functional block diagram of control circuitry of the device of FIG. 1.

FIG. 2 provides a functional block diagram of the device of FIG. 1. A controller 120 provides top level control for the device. The controller 120 is preferably characterized as a general purpose processor with suitable programming to control the operation of the device 100 and to communicate with a host device (not shown).

A data communication path between the media 108 and the host device is established by a hardware interface (I/F) circuit 122, a read/write (R/W) channel 124 and a preamplifier/driver (preamp) circuit 126. The preamp 126 is preferably mounted to the actuator 112, as shown in FIG. 1.

Closed loop servo control of the heads 110 is provided by a servo circuit 128, which outputs current commands to a motor control block 130. The motor control block 130 includes a VCM driver (not shown) which applies current to the VCM 114 to move the heads 110 to the desired position adjacent the media 108. The motor control block 130 further includes circuitry to control the operation of the spindle motor 106, including the periodic activation (spin-up) of the media 108 to an operational velocity sufficient to hydrodynamically support the heads 110 in a reading/writing relationship thereto.

Figure 3:
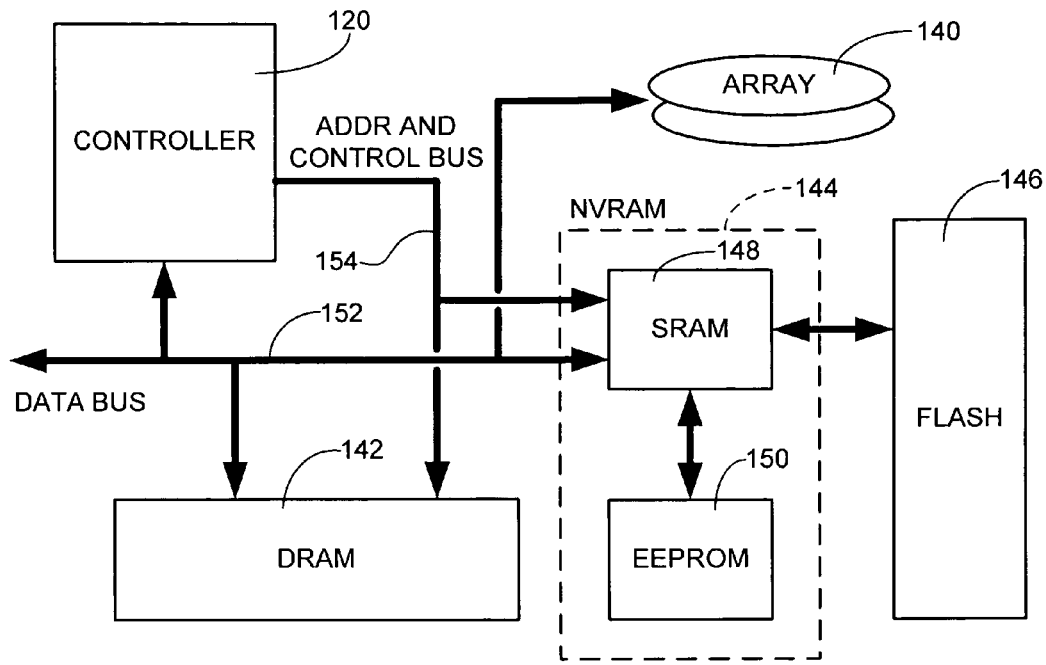
FIG. 3 provides a detailed functional representation of relevant portions of the interface circuit of FIG. 2.

FIG. 3 illustrates a preferred construction of relevant portions of the interface circuit 122 of FIG. 2. As explained below, the circuitry of FIG. 3 is preferably arranged to enhance data integrity during data transfer operations between the host device and the media 108. For reference, FIG. 3 shows the controller 120 of FIG. 2 as well as a downstream block 140, preferably characterized as a data storage array. For reference, the storage array 140 preferably corresponds to the media 108 as well as the intervening channel electronics (R/W channel 124, preamp 126, servo circuit 128, etc.) of FIG. 2.

The circuitry of FIG. 3 is further shown to preferably include a dynamic random access memory (DRAM) block 142, a non-volatile random access memory (NVRAM) block 144 and a flash memory block 146. The NVRAM 144 preferably includes a static random access memory (SRAM) block 148 and an electrically eraseable programmable read only memory (EEPROM) block 150.

A data bus 152 communicates with the host device and provides a main conduit path for the user data transferred between the host device and the array 140. An address and control bus 154 allows the controller 120 to communicate with the respective DRAM 142 and NVRAM 144 during operation. Other configurations are readily contemplated, and the particular operation of each of these components will be explained in detail below.

At this point, however, it will be helpful to briefly discuss some well known attributes of these various types of components. This will aid in a fuller understanding of various aspects and advantages of the preferred embodiments presented herein.

As those skilled in the art will appreciate, the term "volatile" refers to a memory block that maintains data stored therein generally only so long as supply power remains continuously applied to the block. The static and dynamic RAM blocks 142, 148 of FIG. 3 operate in this fashion and are hence considered "volatile" memories as termed herein.

By contrast, "non-volatile" refers to a memory block that maintains data stored therein regardless of whether supply power is removed from the block. The flash memory block 146 and the NVRAM 144 (by way of EEPROM block 150) are characterized as non-volatile memories. For reference, the storage discs 108 of FIG. 1 also provide non-volatile memory storage.

Generally, volatile memories are capable of storing input data at a relatively faster rate as compared to non-volatile memories. At present, solid state volatile memories are also generally less expensive as compared to solid-state non-volatile memories for a given storage capacity size.

Because of the data retention characteristics of a non-volatile memory, such a device can require significantly greater amounts of power to perform read, write and erase functions as compared to a volatile memory.

Moreover, a solid-state non-volatile memory can have a somewhat limited life with regard to the total number of write/erase cycles that can be carried out by the device before wearing out. Depending on the construction, the number of cycles during the useful life of a non-volatile memory device such as the flash memory 146 or EEPROM 150 may be on the order of 100,000 to 1,000,000 (100K to 1M) cycles before wear-out. By contrast, volatile memories can often accommodate an almost unlimited number of read/write cycles.

With regard to the volatile dynamic and static RAM blocks 142, 148, the DRAM 142 is termed "dynamic" because the contents are continually refreshed; that is, during operation the entire contents of the device are read and rewritten many times a second. Thus, so long as power is continuously applied to the DRAM 142, this refreshing operation can continue and the contents will be retained. DRAMs are generally inexpensive and can provide relatively large memory spaces with relatively low power consumption requirements.

The SRAM 148 is termed "static" because the storage charge is held in each cell without the need for continual refreshing. Generally, an SRAM is faster than a DRAM with regard to access operations, but is also more expensive and consumes greater amounts of power as compared to a DRAM of given memory size.

With regard to the flash memory block 146 and the EEPROM block 150, these devices both generally operate to write and erase memory cells through the application of electrical charge. An EEPROM is often configured to carry out write and erase functions on a byte-by-byte basis, whereas a flash memory can concurrently write or erase a larger block of memory.

In view of the foregoing discussion, those skilled in the art will appreciate that the controller 120, array 140, DRAM 142, data bus 152 and control bus 154 provide a standard architecture to handle host-disc I/O operations. That is, data input from the host to be written to the array 140 are temporarily stored in the DRAM 142 pending transfer to the media 108.

The data transfer includes scheduling the transfer of the pending data, using the servo circuit 128 to move the appropriate head 110 to the associated track, and the forwarding of the write data to the R/W channel 124 and preamp 126 for encoding and serialization. In this way, the appropriate write currents are applied to the head 110 to selectively magnetize the associated sector(s) on the disc 108 to provide a magnetization transition pattern that corresponds to the originally unencoded data from the host.

In an effort to maximize overall data throughput, the controller 120 can incorporate well known queuing operations whereby multiple write and read commands are maintained and scheduled for execution in turn. The commands may be executed in an order different from the order in which the commands were received due to proximity, latency and other factors.

If write-caching techniques are employed, the controller 120 may provide the host with a "command complete" status for a given write command even though the data to be written to the array 140 is still pending in the DRAM 142 and has not yet been actually written to the array 140.

This can help ensure that a host application does not get "hung up" waiting for the actual transfer of the data to be completed before sending additional commands. This technique also allows the device 100 to achieve higher throughput rates by scheduling the write operation to occur in conjunction with other read or write operations in the same general vicinity on the discs 108.

While such operations have been found operable, it will be readily understood that with continued expansion of the types of environments in which data storage devices such as 100 are employed, and the ever increased reliance on the data stored therein, it is becoming increasingly desirable to make devices such as 100 increasingly impervious to problems associated with the transfer (storage and/or retrieval) of user data. For example, write-caching provides a risk that the buffered write-back data may be lost if power is interrupted to the device 100, since the data are only retained in volatile memory.

From the foregoing discussion, it can be readily seen that present technological and economic constraints substantially prevent large scale utilization of a non-volatile memory for the DRAM 142; the data capacity of the DRAM is generally selected to be as large as practical to accommodate the complex programming requirements of the controller 120 as well as to provide a large buffer for transferred (write and readback) data. Making this primary buffer a non-volatile memory at present would likely be unworkable in many applications, as the device would be too slow, too costly and require too much power.

Accordingly, preferred embodiments of the present invention, as set forth by FIG. 3, utilize the volatile DRAM 142 in conjunction with the NVRAM 144 and flash 146 to provide a parallel buffer arrangement with both volatile and non-volatile elements. This provides a hybrid solution that preserves the best advantages of both types of memory.

Figure 4:
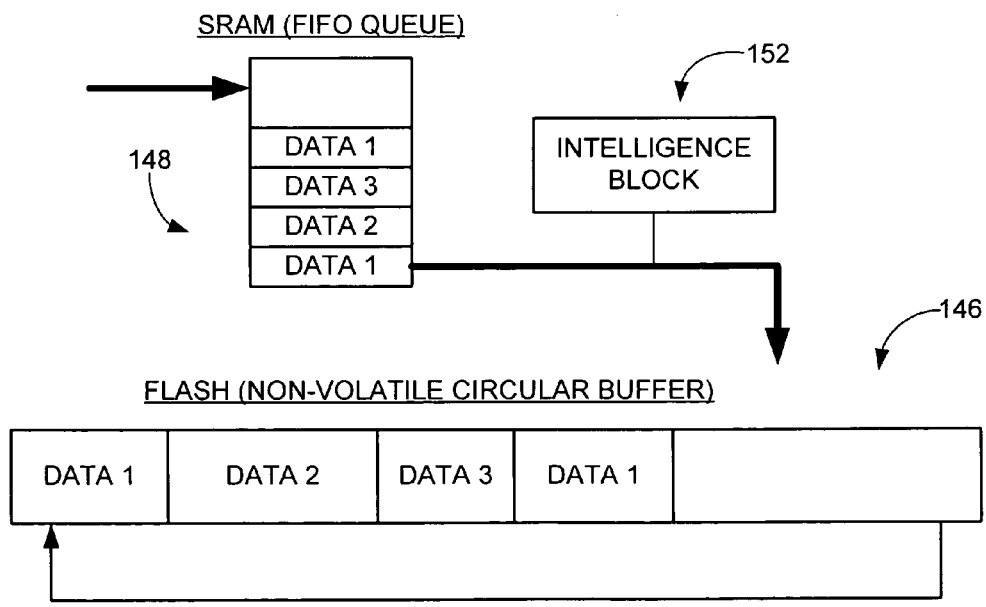
FIG. 4 represents a preferred configuration of the non-volatile flash device of FIG. 3 as a circular buffer.

Reference is made again to the NVRAM and flash memory blocks 144, 146. As shown in FIG. 4, during normal operation data are provided to the NVRAM 144 and stored in the SRAM 148. It is contemplated that the EEPROM 150 is a standby device so that the contents of the SRAM 148 are only transferred to the EEPROM 150 in the event of a power failure or other anomalous condition.

At this point it will be noted that, in alternative preferred embodiments, the NVRAM 144 can incorporate other mechanisms such as a battery in lieu of the EEPROM 150 to maintain the volatile SRAM 148 in a non-volatile condition. In other alternative embodiments, a stand-alone volatile device (such as an SRAM) is used as the front end to the flash memory 146 without a separate non-volatile back up mechanism; that is, an NVRAM is preferred but not required.

It is contemplated that the data capacity of the SRAM 148 (which mirrors the data capacity of the backup EEPROM 150) is relatively small compared to the data capacity of the DRAM 142. To provide a concrete illustration, the SRAM 148 may have a data capacity on the order of about 64 KB whereas the DRAM 142 may have a data capacity on the order of about 16 MB. Depending on the requirements of a given application, a limiting factor on the maximum size of the SRAM 148 are the time and/or power constraints in transferring the contents of the SRAM 148 to the EEPROM 150 in the event of power failure.

The SRAM 148 preferably stores data in a FIFO queue arrangement for subsequent transfer to the flash memory 146. The flash memory 146 is preferably arranged as a circular buffer, so that data written to the flash is carried out in such a fashion that the flash does not overwrite the same memory location without first having made an entire round trip through the memory. This advantageously prevents a localized portion of the memory to receive a greater number of write and erase operations as compared to the rest of the memory and "levels out" the wear upon the device.

It can be seen that the size of the flash memory 146 can be made many times that of the SRAM 148 and, indeed, is preferably made as large as practicable (e.g., on the order of 64 MB, 128 MB, 256 MB, etc. depending on cost constraints). Because flash memory can be a commodity item, larger flash may be more economical than smaller capacities under certain circumstances.

FIG. 4 provides an illustrative example of the foregoing operation. During I/O operations with the host, the controller 120 is shown to have sequentially provided blocks of data referred to as DATA 1, DATA 2, DATA 3, and then DATA 1 to the SRAM 148, in the above order. Each of these blocks are contemplated as having an associated range of logical block addresses (LBAs) tied to physical sectors on the media 108. The second occurrence of DATA 1 is an updated version of the initial DATA 1 data set.

An intelligence block 152, such as an associated routine of the controller 120 or a separate device, preferably directs the writing of each of these blocks in the SRAM 148 to associated adjacent locations of the flash memory 146. While the SRAM 148 is contemplated as comprising a relatively very fast device, the flash memory 146 can be much slower so that the writing of the respective blocks to the flash 146 can be scheduled at appropriate times.

This advantageously provides the opportunity to perform data integrity checks (write-read-verify, etc.) upon the flash memory 146 as required. The circular buffer arrangement of the flash memory 146 also greatly simplifies defect management; for example, a bit-map can be used to identify good and bad blocks of memory cells, and the bad blocks of cells can be skipped during the next write from the SRAM 148.

The circular buffer arrangement also greatly simplifies data revision management techniques. To find the latest version of a given set of data within the flash memory 146 (such as the second DATA 1 block), all that is generally required is a backwards search through the flash memory 146 starting at the most recently written block; the first occurrence of a given LBA range of data will constitute the most recent version of the associated data.

Another advantage of the flash memory 146 is that, as desired, there is plenty of room and time to accommodate additional levels of error detection and correction algorithms. Parity codes can be calculated and written with the blocks to the flash to further ensure data integrity. Such algorithms can also serve to advantageously extend the useful life of the flash memory 146.

Referring again to FIG. 3, it will now be appreciated that DRAM 142 provides a first volatile memory block into which input host data can be placed for subsequent transfer to the array 140. Alternatively, the input host data can be placed into the SRAM 148 as a second volatile memory block for subsequent transfer to the non-volatile circular buffer of flash memory 146.

Once in the circular buffer 146, data integrity is maintained so that, as desired, the data can be permanently stored therein for as long as the host needs it. However, in a preferred embodiment, the data in the flash is periodically flushed to the array 140 for subsequent retrieval therefrom. Regardless of whether the data are stored in the flash memory 146 or the storage array 140, a common host level addressing scheme is preferably employed, such as via the aforementioned LBAs. Thus, the circuitry of FIG. 3 preferably operates in a manner wholly transparent to the host.

Figure 5:
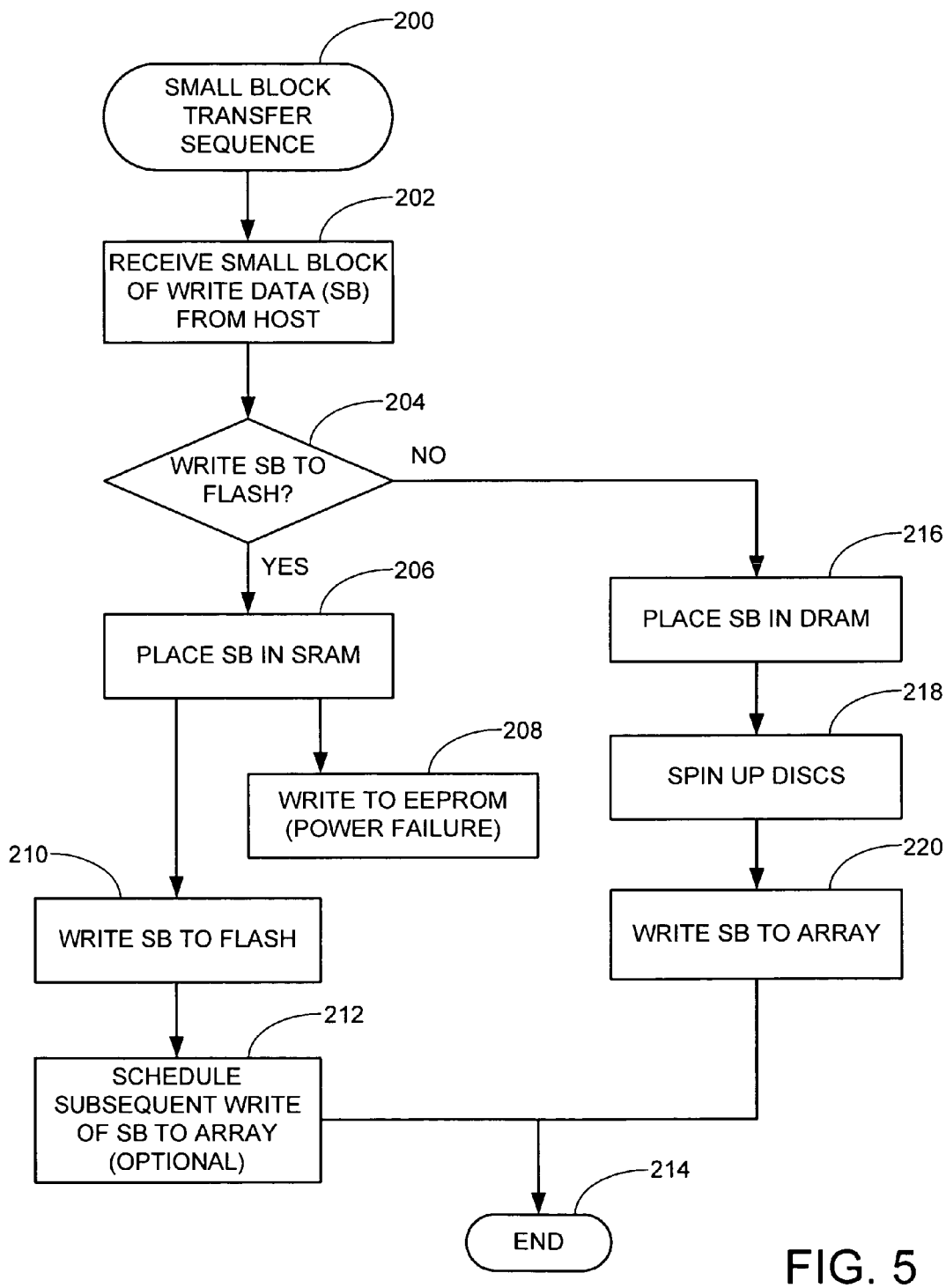
FIG. 5 provides a flow chart for a SMALL BLOCK TRANSFER SEQUENCE routine, illustrative of steps carried out by the device of FIG. 1 in accordance with preferred embodiments of the present invention to handle the writing of relatively small blocks of data.

FIG. 5 provides a SMALL BLOCK TRANSFER SEQUENCE routine 200, representative of preferred steps carried out by the device 100 to handle relatively small blocks of user data from the host.

At step 202, a small block (SB) of user data is received from the host for storage by the device 100. A decision is preferably made at decision step 204 as to how to direct the SB data. It is contemplated that, in general, smaller blocks of data will preferably be directed to the flash memory 146 whereas larger blocks of data will be directed to the DRAM 142.

In such case, the decision algorithm of step 204 may constitute little more than a simple evaluation of the block (LBA) size of the SB. For example, a single data transfer of size larger than the data capacity of the SRAM 148 may not likely be readily handled by the SRAM 148.

More robust algorithms, however, can be advantageously employed that take into account other factors such as system resource availability at a given time; for example, the SRAM 148 may be full or nearly full from previous requests that have not yet been flushed to the flash memory 146, or the SRAM and/or flash memory 146 may be busy servicing a prior read-back data cache request.

Moreover, the SB data may be determined to have a close proximity to other ongoing data transfer requests and could thus be readily written during another scheduled write event, in which case it may be more efficient to move the SB to the DRAM 142 for write-back caching. An associated data integrity status may also be weighed in determining where to send the SB data.

When decision step 204 decides to send the SB data to the flash memory 146, the routine of FIG. 5 proceeds to step 206 whereby the SB data are written to the SRAM 148.

As mentioned previously, the SRAM 148 is preferably configured as non-volatile protected RAM so that, as shown by step 208, at any given instant in time the contents of the SRAM 148 are transferred to the EEPROM 150 when a power failure or other anomalous event is detected.

At step 210, the SB contents of the SRAM 148 are next scheduled for transfer to the circular buffer of the flash memory 146, preferably as described above. As desired, all or portions of the data stored in the flash memory 146 are subsequently written to the storage array 140 at step 212 at a convenient time. This may include during an idle period of operation for the device 100, or in conjunction with another access operation proximate to the LBA locations on the media 108 associated with the data stored in the flash memory.

For clarity, the process is then shown to end at step 214, although it will be appreciated that the routine of FIG. 5 is iterative.

Returning to decision step 204, if the SB data are to be written to the array 140, the process flow continues to step 216 where the SB data are stored in an associated segment of the DRAM 142. The discs 108 are spun up at step 218, the SB data are written at step 220, and the process ends as before at step 214.

It will be appreciated that the operations of steps 218 and 220 may literally involve starting rotation of the discs 108 from rest (thereby bringing the device out of a temporarily deactivated state). Indeed, one of the advantages of the preferred circuit construction of FIG. 3 is that host data can be immediately stored in non-volatile memory without the need to have the device 100 in an operationally ready mode; this can significantly extend battery life in portable applications.

Alternatively, the operation of steps 218, 220 can be viewed as involving command queue scheduling whereby an algorithm is employed to identify the next most efficient command(s) to execute, in which case the servo circuit 128 moves the appropriate head to the appropriate track to transfer the data as part of a larger data management scheme.

Write caching and host reporting can take place as before regardless whether the data are written to the array 140 or to the flash memory 146.

Figure 6:
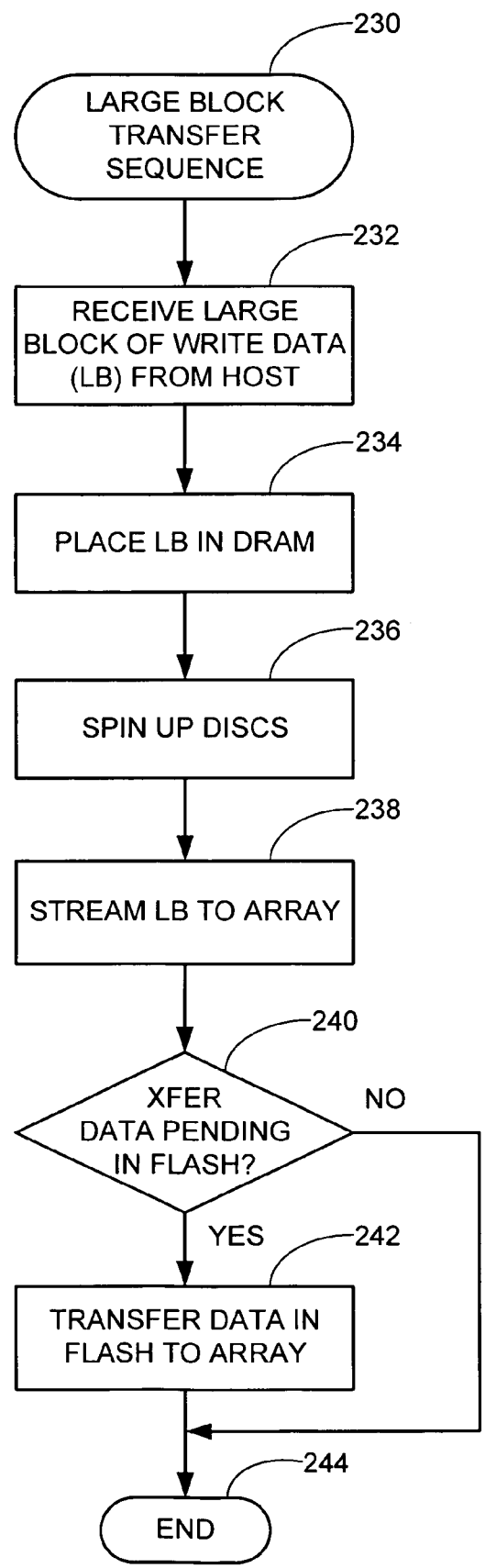
FIG. 6 provides a flow chart for a LARGE BLOCK TRANSFER SEQUENCE routine, illustrative of steps carried out by the device of FIG. 1 in accordance with preferred embodiments of the present invention to handle the writing of relatively large blocks of data.

FIG. 6 provides an alternative LARGE BLOCK TRANSFER SEQUENCE routine 230, representative of steps carried out by the device 100 to handle larger write sequences, such as streamed data (video, audio, etc.) in which a substantially continuous series of LBAs are to be written to the device 100.

At step 232, a large block (LB) of user data are received from the host and streamed into the DRAM 142 at step 234. As before, the discs 108 are spun-up at step 236 and the data are written to the array 140 at step 238.

At a convenient point, the routine further preferably determines at decision step 240 whether data pending in the flash memory 146 should also be moved to the array 140; if so, the routine proceeds to step 242 where this operation is carried out as well. The routine then ends at step 244, although as before, FIG. 6 is preferably iterative in nature with the routine of FIG. 5.

Figure 7:
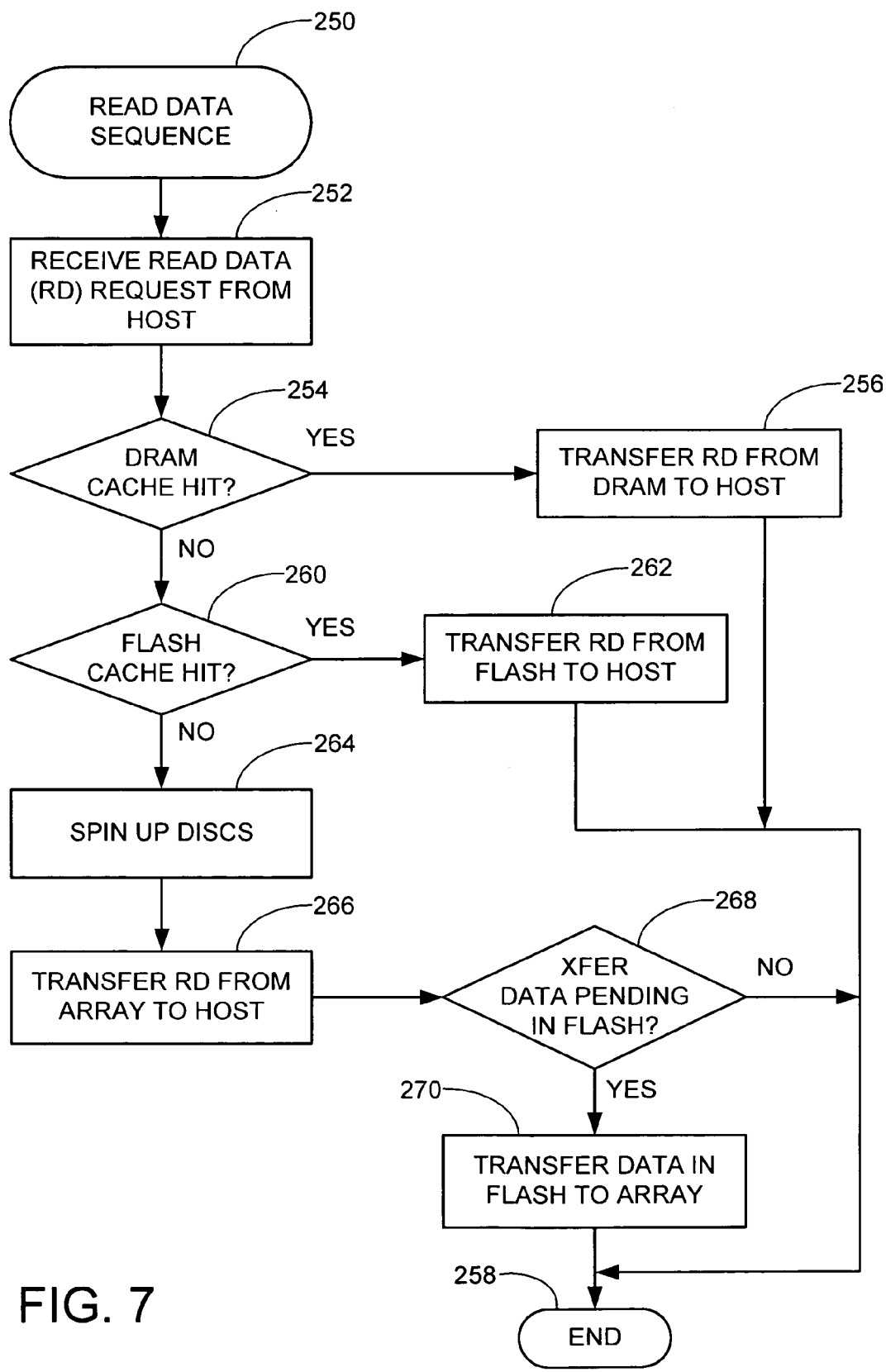
FIG. 7 provides a flow chart for a READ DATA SEQUENCE routine, illustrative of steps carried out by the device of FIG. 1 in accordance with preferred embodiments of the present invention to read back data previously stored by the routines of FIGS. 5 and/or 6.

FIG. 7 provides a READ DATA SEQUENCE routine 250, representative of steps preferably carried out to read back data previously transferred by the device 100.

At step 252, a read data (RD) request is received by the controller 120. As those skilled in the art will appreciate, a "cache hit" generally comprises a situation where data previously stored by the device is resident in the interface circuit 122 and can be satisified without the performance hit of an access operation upon the array 140.

Decision step 254 thus first determines whether the RD request can be satisfied from the DRAM 142; if so, the routine proceeds to satisfy the RD request from the DRAM 142 at step 256 (and the routine ends at step 258). If not, the routine next determines at step 260 whether the RD request can be satisfied from the flash memory 146. If so, the routine proceeds to satisfy the RD request from the flash memory at step 262.

Otherwise, the discs 108 are spun-up at step 264 and the data are retrieved from the array 140 at step 266. As before, if data in the flash memory 262 are to be transferred to the array 140 in conjunction with the data retrieval of step 266, such operations are additionally carried out, as indicated by steps 268 and 270.

It will now be appreciated that the various preferred embodiments of the present invention discussed above provide several advantages over the prior art. Using a fast, NV protected SRAM (or similar device) in conjunction with a larger and slower flash allows the user data to be fully protected from the moment the data are received by the device 100, without the delays, power requirements and costs associated with writing data directly to a non-volatile transfer buffer.

Thus, parallel paths between volatile and non-volatile transfer buffers can be provided with no appreciable delay associated with the writing of the input data to the non-volatile transfer buffer from a host standpoint. Indeed, in the illustrative embodiment of FIG. 3, the input data may likely be written to the SRAM 148 faster than it can be written to the DRAM 142.

While the above preferred embodiments have been generally directed to a data storage device, such is not limiting. Rather, the claimed invention is explicitly contemplated for use in any number of different types of data transfer systems, such as communication systems that transfer data across a link, a network or any other type of communication path to a downstream block.

In view of the foregoing discussion, the various preferred embodiments of the present invention are generally directed to an apparatus and method for transferring data.

The apparatus preferably comprises a first volatile memory block (such as DRAM 142), a second volatile memory block (such as SRAM 148) coupled to a non-volatile circular buffer (such as flash 146), and a controller (such as 120) configured to direct first data to the first volatile memory block for subsequent transfer to a downstream block (such as 140), and to direct second data to the second volatile memory block for subsequent transfer to the non-volatile circular buffer (such as by FIGS. 5 and 6).

Preferably, the apparatus further comprises a mechanism (such as EEPROM 150) to provide the second volatile memory block with non-volatile retention of data written to said second volatile memory block in the event of an interruption of supply power to said second volatile memory block. The second volatile memory preferably forms a portion of a non-volatile random access memory (NVRAM) (such as 144).

The second volatile memory block is preferably characterized as a first-in-first-out (FIFO) queue (such as in FIG. 4) so that blocks of data written in a selected sequence to the second volatile memory block are transferred in said sequence to the circular buffer. An intelligence block (such as 152) preferably controls said subsequent transfer of the second data from the second volatile memory block to the circular buffer.

In further preferred embodiments, the method preferably comprises steps of using (such as by steps 216, 234) a controller (such as 120) to direct first data to a first volatile memory block (such as 142) for subsequent transfer to a downstream block (such as 140), and using (such as by steps 206, 210) the controller to direct second data to a second volatile memory block (such as step 206) for subsequent transfer to a non-volatile circular buffer (such as 146).

The method further preferably comprises transferring (such as by steps 212, 240, 242, 268, 270) the second data from the non-volatile circular buffer to the storage array.

For purposes of the appended claims, the recited first means will be understood consistent with the foregoing discussion to correspond to at least the SRAM 148 of NVRAM 144 of FIG. 3.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

In addition, although the embodiments described herein are directed to the transfer of data in a hard disc drive data storage device, it will be appreciated by those skilled in the art that the claimed subject matter is not so limited, but rather extends to any number of different applications in which data are transferred, including communication systems that transfer data across a link, network or other communication path.

What is claimed is:

1. An apparatus comprising a first volatile memory block, a second volatile memory block coupled to a non-volatile circular buffer, and a controller configured to direct first data to the first volatile memory block for subsequent transfer to a downstream block, to direct second data to the second volatile memory block for subsequent transfer to the non-volatile circular buffer, and to check for a cache hit from the first volatile memory block and from the circular buffer responsive to a data retrieval request for a set of selected data.

2. The apparatus of claim 1, further comprising a mechanism to provide the second volatile memory block with non-volatile retention of data written to said second volatile memory block in the event of an interruption of supply power to said second volatile memory block.

3. The apparatus of claim 1, wherein the second volatile memory block composes a portion of a non-volatile random access memory (NVRAM).

4. The apparatus of claim 1, wherein at least a selected one of the first and second volatile memory blocks comprises a dynamic random access memory (DRAM).

5. The apparatus of claim 1, wherein at least a selected one of the first and second volatile memory blocks comprises a static random access memory (SRAM).

6. The apparatus of claim 1, wherein the circular buffer is characterized as a flash memory device.

7. The apparatus of claim 1, wherein the second volatile memory block is characterized as a first-in-first-out (FIFO) queue so that blocks of data written in a selected sequence to the second volatile memory block are transferred in said sequence to the circular buffer.

8. The apparatus of claim 1, wherein the first and second data each respectively comprise user data addressable by a host device using respective logical block addresses (LBAs).

9. The apparatus of claim 1, wherein the controller is further configured to transfer the second data from the circular buffer to the downstream block concurrently with the transfer of the first data from the first volatile memory block to the downstream buffer.

10. The apparatus of claim 1, further comprising an intelligence block which controls said subsequent transfer of the second data from the second volatile memory block to the circular buffer.

11. The apparatus of claim 10, wherein the intelligence block appends an error correction code to the second data transferred from the second volatile memory block to the circular buffer.

12. A method comprising:
   using a controller to direct first data to a first volatile memory block for subsequent transfer to a downstream block;
   using the controller to direct second data to a second volatile memory block for subsequent transfer to a non-volatile circular buffer; and
   transferring the second data from the non-volatile circular buffer to the storage array in conjunction with the first using step so that both the first and second data are concurrently transferred to the storage array.

13. The method of claim 12, further comprising a step of providing a mechanism to provide the second volatile memory block with non-volatile retention of data written to said second volatile memory block in the event of an interruption of supply power to said second volatile memory block.

14. The method of claim 12, wherein the downstream block comprises a storage array.

15. The apparatus of claim 1, wherein the second data are not stored in the first volatile memory block.

16. The apparatus of claim 1, wherein the non-volatile circular buffer has a first total data capacity, and wherein the second volatile memory block has a second total data capacity substantially less than the first total data capacity.

17. The apparatus of claim 1, wherein the first volatile memory block has a first total data capacity, and wherein the second volatile memory block has a second total data capacity substantially less than the first total data capacity.

18. The apparatus of claim 1, wherein data are written to the first volatile memory block at a first data transfer rate, and wherein data are written to the second volatile memory block at a second data transfer rate greater than the first data transfer rate.

19. The method of claim 12, wherein the second data are not stored in the first volatile memory block.

20. The method of claim 12, wherein the first volatile memory block has a first total data capacity, and wherein the second volatile memory block has a second total data capacity substantially less than the first total data capacity.

21. The method of claim 20, wherein the non-volatile circular buffer has a third total data capacity, and wherein the third total data capacity is substantially greater than the first total data capacity and is substantially greater than the second total data capacity.

22. The method of claim 12, wherein data are written to the first volatile memory block at a first data transfer rate, and wherein data are written to the second volatile memory block at a second data transfer rate greater than the first data transfer rate.

23. An apparatus comprising a first volatile memory block, a second volatile memory block coupled to a non-volatile circular buffer, and a controller configured to direct writing of first data to the first volatile memory block at a first data transfer rate for subsequent transfer to a downstream block, and to direct writing of second data to the second volatile memory block at a second data transfer rate greater than the first data transfer rate for subsequent transfer to the non-volatile circular buffer.

24. The apparatus of claim 23, wherein the controller is further configured to, responsive to a data retrieval request for a set of selected data, to check for a cache hit from the first volatile memory block and from the circular buffer for said set of selected data.

25. The apparatus of claim 24, wherein the downstream block forms a portion of a main memory space, and wherein the controller is further configured to direct reading of the set of selected data from the main memory space when a cache hit is not obtained for the set of selected data from the first volatile memory block and the circular buffer.

26. The apparatus of claim 23, wherein the controller is further configured to transfer the second data from the circular buffer to the downstream block concurrently with the transfer of the first data from the first volatile memory block to the downstream buffer.

27. The apparatus of claim 23, wherein the controller appends an error correction code to the second data transferred from the second volatile memory block to the circular buffer.

* * * * *